United States
Garman et al.

[11] 3,775,700
[45] Nov. 27, 1973

[54] GAS LASER

[75] Inventors: Lewayne E. Garman, Sunnyvale; Piet T. Kluytmans, San Jose; Willy H. Vanbragt, Sunnyvale, all of Calif.

[73] Assignee: C W Radiation, Inc., Mountain View, Calif.

[22] Filed: Apr. 6, 1971

[21] Appl. No.: 131,654

[52] U.S. Cl.................. 331/94.5, 350/27, 350/178, 350/288, 350/289
[51] Int. Cl............................ H01s 3/22, H01s 3/02
[58] Field of Search..................... 331/94.5; 350/27, 350/178, 288, 289; 330/4.3; 250/199

[56] References Cited
UNITED STATES PATENTS
3,566,302  2/1971  Rhodes.............................. 331/94.5
3,588,737  6/1971  Chow................................ 331/94.5

OTHER PUBLICATIONS
Goodwin et al., IEEE J. of Quantum Electronics Vol. 6, No. 11, Nov. 1970 PP. 756–757 QC447I2
Hernquist, RCA Review, Vol. 30, Sept. 1969, pp. 429–433. TK 6,40 R122

Primary Examiner—David Schonberg
Assistant Examiner—R. J. Webster
Attorney—Harry E. Aine and William J. Nolan

[57] ABSTRACT

A capillary gas discharge confining tube having Brewster angle windows sealed across opposite ends thereof is hermetically sealed coaxially within a gas tight cylindrical envelope via a pair of annular end walls disposed proximate the ends of the capillary. A similar annular wall is hermetically sealed between the capillary and the outer envelope intermediate the length of the capillary for providing a center support for the capillary and for dividing the envelope into an anode chamber and a cathode chamber. The side walls of the capillary are expanded and thinned to form bellows inside the end walls of the envelope at opposite ends of the capillary to allow expansion and contraction of the capillary in use. The capillary has openings for gas communication between the respective cathode and anode chambers and the capillary. Adjustable mirrors of the optical resonator are affixed over the ends of the cylindrical envelope. Adjustment screws are provided for adjusting the parallelism of the mirrors.

9 Claims, 3 Drawing Figures

PATENTED NOV 27 1973 3,775,700
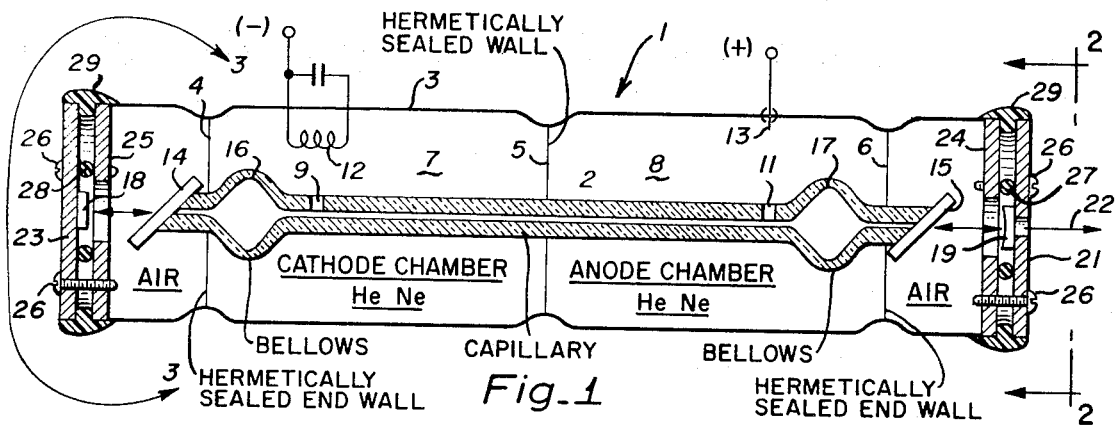
Fig_1
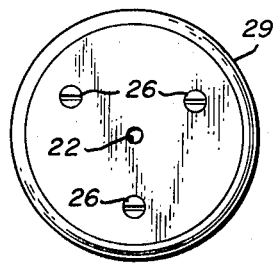
Fig_2
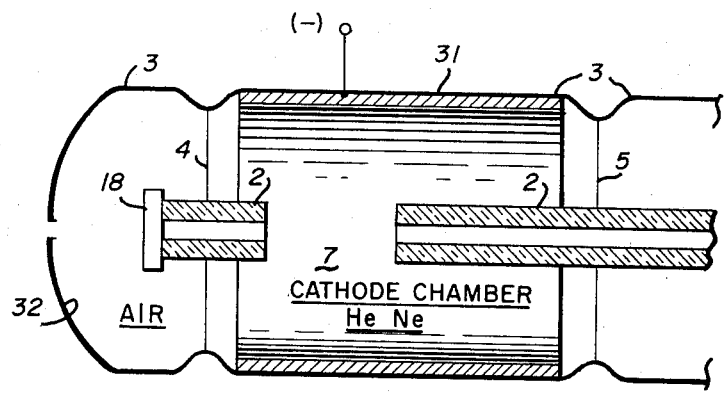
Fig_3
INVENTORS
LEWAYNE E. GARMAN
PIET T. KLUYTMANS
WILLY H. VANBRAGT
BY
ATTORNEY

GAS LASER

DESCRIPTION OF THE PRIOR ART

Heretofore, coaxial type gas lasers have been constructed wherein a capillary discharge tube was coaxially disposed within an outer tubular envelope of the laser. The ends of the outer cylindrical envelope were closed by end walls which supported the mirrors of the optical resonator.

The problem with this prior laser construction is that the end walls of the gas tight envelope supported the mirrors of the optical resonator. The end walls were adjustable for aligning the parallelism of the mirrors of the optical resonator. However, after alignment the mirrors had to be sealed into position to complete the gas tight integrity of the envelope. Thus, the tube could not be evacuated, filled with the laser gain medium and tested until after the mirrors, which are a relatively expensive portion of the laser, had been sealed and fixed in position. Thus, if upon testing the laser failed to meet its performance specifications, the entire laser had to be scrapped or rebuilt, thereby substantially increasing production costs.

SUMMARY OF THE PRESENT INVENTION

Principal object of the present invention is the provision of an improved gas laser.

In one feature of the present invention, a coaxial gas laser tube construction is provided which includes end sealing walls for sealing the capillary discharge tube to the outer tubular envelope at the ends of the capillary with the ends of the capillary being sealed, whereby the gas tight integrity and the power output of the laser may be tested without having to seal the tube into the optical resonator.

In another feature of the present invention, one or more bulbous portions are provided in the capillary, such bulk being of substantially thinner wall construction to allow thermal expansion and contraction of the capillary without changing the length of the overall capillary tube.

In another feature of the present invention, one or more mirrors of the optical resonator are disposed upon support structures closing off one or more ends of the outer tubular envelope, such mirror support being external of the gas tight envelope of the tube and being adjustable during manufacture for obtaining proper alignment of the optical resonator.

In another feature of the present invention, an adjustable mirror support structure for the optical resonator includes a rigid mounting flange member secured to the outer envelope of the laser, an adjustable mounting plate having a mirror of the optical resonator affixed thereto. A resilient deformable member is captured between the rigid mounting flange and the adjustable mounting plate. Screw means are provided for variably adjusting the deformation of the captured deformable member to permit alignment of the mirrors of the optical resonator.

Other features and advantages of the present invention will become apparent upon perusal of the following specification taken in connection with the accompanying drawings, wherein:

BRIEF DESCRIPTION OF THE DRAWINGS

FIG. 1 is a longitudinal sectional view, partly in schematic line diagram form of a coaxial gas laser incorporating features of the present invention, FIG. 2 is a view of the structure of FIG. 1 taken along line 2—2 in the direction of the arrows, and FIG. 3 is a view of an alternative embodiment of that portion of the structure of FIG. 1 delineated by line 3—3.

DESCRIPTION OF THE PREFERRED EMBODIMENTS

Referring now to FIG. 1, there is shown a coaxial gas laser 1 incorporating features of the present invention. The laser 1 includes an elongated gas discharge confining tube 2 centrally and coaxially disposed of a cylindrical outer envelope 3, as of pyrex glass 1 inch in diameter and 1-3 mm wall thickness. The discharge tube 2 is preferably a capillary tube having an inside bore diameter which is small in comparison to the wall thickness of the discharge tube 2. The discharge tube 2 and the outer envelope 3 are preferably made of the same material such as quartz or pyrex glass.

In the process of sealing the discharge tube 2 within the outer envelope 3 annular washer-shaped partitioning walls 4, 5 and 6 are first sealed at their inner periphery to the outer periphery of the discharge tube 2. The discharge tube 2 is then inserted within the outer envelope 3 and, with a proper jig, held in coaxial alignment with the outer tube 3. The outer tube 3 is then necked down in diameter to produce a fused glass seal between the outer periphery of the partitions 4, 5 and 6 and the inside wall of the outer envelope 3.

The center partitioning wall 5 partitions the gas envelope of the tube 1 into an annular cathode chamber 7 and an annular anode chamber 8. Transverse bores 9 and 11 are made through the wall of the capillary tube 2 to provide gas communication passageways between the respective cathode chamber 7 and anode chamber 8 near the opposite ends of the capillary discharge tube 2. A thermionic cathode emitter 12 is disposed in the cathode chamber 7 and an anode electrode 13, such as a tungsten rod, is disposed in the anode chamber 8.

A pair of Brewster angle windows 14 and 15 are hermetically sealed across the opposite ends of the capillary discharge tube 2, as by epoxy cement. In a typical example, for a laser operating at an optical wavelength of 6,328 A the planes of the Brewster angle windows 14 and 15 are disposed at an angle of 34°28' relative to a plane perpendicular to the axis of the discharge tube 2. Brewster angle windows 14 and 15 together with the end walls 4 and 5 and the outer envelope tube 3 define the vacuum tight or gas tight envelope of the laser 1.

In a typical example, the envelope 3 is filled with a suitable laser gain medium, such as helium-neon, carbon dioxide, or argon. In the case of a helium-neon laser operating at a wavelength of 6,328 A, the envelope is filled with a helium-neon gas mixture to a pressure of between 1-5 torr with between 5 and 10 parts helium to one part neon. With an electrical potential applied between the cathode 12 and anode 13 an electrical glow discharge is initiated which spreads into the discharge tube to fill the central bore of the capillary with an electrical glow discharge.

The electrical discharge serves to invert the population density of electronic energy states of the gas between which stimulated emission of radiation is obtained at a wavelength corresponding to the operating wavelength of the laser, such as 6,328 A. The electrical discharge causes the capillary tube 2 to operate at an elevated temperature, as of 100°C.

A pair of blown expansion bellows 16 and 17 are provided in the capillary tube proximate the ends walls 4 and 6 to allow for thermal expansion and contraction of the central portion of the discharge capillary tube 2 without transmitting stress to the end walls 4 and 6 and without changing the overall length of the tube 2 between the Brewster angle windows 14 and 15.

The advantage of the gas laser tube construction wherein the capillary discharge tube 2 is sealed within the envelope 3 by means of the end walls 4 and 6 is that the tube may be tested for leaks and its glow discharge characteristics without having to permanently mount the discharge tube in the optical resonator of the laser. The laser output can also be tested by inserting the gas discharge tube into an optical resonator and adjusting the optical resonator for optium laser output. Once the tube has been tested the optical resonator may be incorporated as a portion of the discharge tube.

More specifically, a pair of end mirrors 18 and 19, having a reflectivity peaked for maximum reflectance at the operating wavelength of the laser are mounted over the ends of the tubular envelope 3. End mirror 18 comprises a flat mirror having essentially 99.9 percent reflectance. Output mirror 19 comprises a spherical concave reflective surface with a relative large radius of curvature, as of 30 centimeters to 3 meters which is affixed over a centrally apertured mounting plate 21, as of Kovar, steel or quartz. The output mirror 19 is coated with a reflective coating to provide less than 100 percent reflectance, as of 98.0 percent, such that a relatively small percentage of the light reflected back and forth between the two mirrors 18 and 19 of the optical resonator passes through the output mirror 19 as an output beam 22.

The mirrors 18 and 19 of the optical resonator are each affixed, as by epoxy cement, to its respective circular mirror mounting plate 23, respectively. The mounting plates 21 and 23 are fixedly secured to annular mounting flanges 24 and 25, respectively, each of which is fixedly secured to the end of the envelope 3, as by a seam of epoxy cement at the outer periphery of the mounting flanges 24 and 25. Each mounting flange 24 and 25 is provided with three tapped holes at 120° intervals around the flange to receive adjusting screws 26 which pass through similar holes in the mirror mounting plates 21 and 23.

A deformable resilient member, such as a rubber O-ring 27 and 28, is captured between each of the mirror mounting plates 21 and 23 and the respective mounting flange 24 and 25. The adjusting screws 26 are tightened down to force the mounting plates 21 and 23 into engagement with the O-rings 27 and 28. The adjusting screws 26 are individually adjusted to obtain precise parallelism between the end mirrors 18 and 19 of the optical resonator to obtain an output beam 22 of maximum intensity.

Once the mirrors 18 and 19 have been precisely adjusted for optimum output beam intensity, a seam of epoxy cement 29 is placed between the mounting plates 21 and 23 and the respective flanges 24 and 25 for cementing and holding the mounting plates 21 and 23 into their precisely aligned positions. These adjustments of the screws 26 are obtained with the laser in operation. In this manner, the output performance of each laser is optimized.

Referring now to FIG. 3, there is shown an alternative embodiment of the present invention. The embodiment of FIG. 3 is substantially the same as that of FIG. 1 with the exception that the thermionic cathode emitter 12 is replaced by a cold cathode cylinder 31, as of aluminum, which is disposed just inside the envelope 3 in the cathode chamber 7. The discharge capillary tube 2 is separated into two portions axially spaced within the cathode chamber 7 to provide ample gas communication between the discharge tube and the cold cathode region of the cathode chamber 7.

The Brewster window 14 at the cathode end of the tube is replaced by a fixed flat end mirror 18 which is epoxied over the cathode end of the discharge tube 2, thereby eliminating the necessity of an adjustable end mirror assembly and the Brewster window 14. The mirror 18 seals the cathode end of the discharge tube 2, in a gas tight manner. The outer envelope 3 of the tube 1 is drawn down at 32 to provide protection for the end mirror 18. The gap in the discharge tube 2 also eliminates the necessity of the transverse cathode bore 9 and of the cathode bellows 16, thereby effecting further economies in the production costs of the gas laser tube.

Although the gas laser tube 1 of FIG. 1 has been shown with a cathode chamber 7 at one end and an anode chamber 8 at the other with a single partition 5 therebetween, the cathode chamber 7 could be disposed intermediate the length of the discharge tube with anode chambers 8 at opposite ends of the capillary tube 2. This would be obtained by providing two annular partitioning walls 5 intermediate the length of the discharge tube 2.

What is claimed is:

1. In a gas laser, means defining a tubular envelope, discharge tube means coaxially disposed within said envelope for containing a gaseous gain medium, centrally apertured wall means for hermetically sealing said tubular envelope to said discharge tube proximate the ends of said discharge tube for rigidly supporting said discharge tube within said envelope and for defining gas tight end walls of said envelope, at least one window hermetically sealed over one end of said discharge tube, means for establishing an electrical discharge in said gaseous gain medium within said discharge tube for inverting the population densities of energy levels of said gain medium, optical resonator means having a pair of spaced vertical reflectors axially aligned with said discharge tube for reflecting light back and forth between said reflectors and through said gas filled discharge tube for sustaining stimulated coherent emission of optical radiation from said gaseous gain medium, said discharge tube including at least one bulbous side wall portion of substantially thinner wall thickness than the adjacent portions of said discharge tube, said bulbous portion being disposed intermediate said gas tight end walls of said envelope for allowing axial expansion and contraction of the central portion of said discharge tube without affecting movement of the end portion of said discharge tube which is rigidly supported from said envelope by said end wall means.

2. The apparatus of claim 1 wherein said discharge tube is a capillary tube having an axial bore of a diameter less than the wall thickness of said discharge tube, annular partitioning wall means sealed between said tubular envelope and said capillary tube intermediate said end walls for supporting said discharge tube within said envelope and for partitioning said gas filled envelope into axially spaced cathode and anode chambers, said capillary discharge tube having gas communication passageways communicating with respective anode and cathode chambers proximate opposite ends thereof for providing gas communication between the interior of said discharge tube and the respective cathode and anode chambers of said envelope.

3. The apparatus of claim 2 including, cathode and anode electrodes disposed in said respective cathode and anode chambers of said envelope for establishing an electrical discharge through said capillary tube.

4. The apparatus of claim 1 wherein said tubular envelope, said discharge tube, and said end walls are all made of glass, and wherein fused glass seals are provided at the junctures of said envelope, discharge tube, and end walls with each other.

5. In a gas laser, means defining a tubular envelope, discharge tube means coaxially disposed within said envelope for containing a gaseous gain medium, centrally apertured wall means for hermetically sealing said tubular envelope to said discharge tube proximate the ends of said discharge tube for rigidly supporting said discharge tube within said envelope and for defining gas tight end walls of said envelope, at least one window hermetically sealed over one end of said discharge tube, means for establishing an electrical discharge in said gaseous gain medium within said discharge tube for inverting the population densities of energy levels of said gain medium, optical resonator means having a pair of spaced optical reflectors axially aligned with said discharge tube for reflecting light back and forth between said reflectors and through said gas filled discharge tube for sustaining stimulated coherent emission of optical radiation from said gaseous gain medium, said optical resonator means including at least one adjustable optical reflector support means integrally carried from and affixed across an end of said tubular envelope and disposed externally of said envelope in axially spaced relation from said window for positioning said supported optical reflector of said optical resonator in axial alignment with said discharge tube, and means for adjusting the positioning of said optical reflector support means.

6. The apparatus of claim 5 wherein said optical reflector support means includes; a centrally apertured mounting plate having said optical reflector affixed thereto over said central aperture, a mounting flange member fixedly secured to said tubular envelope adjacent said mounting plate, a compressible resilient member captured between said mounting flange and said mounting plate, and a plurality of adjusting screws securing said mounting plate to said mounting flange for adjusting the deformation of said compressible resilient member to adjust the angle of reflection of said optical reflector which is affixed to said mounting plate.

7. The apparatus of claim 6, wherein said compressible resilient member is a ring of elastic material.

8. The apparatus of claim 6, including solidified adhesive material disposed between said mounting plate and said mounting flange for cementing and holding said mounting plate in a selected rigid position relative to said envelope.

9. The apparatus of claim 1 wherein a pair of said bulbous portions of said discharge tube are provided intermediate of and proximate said end walls of said envelope.

* * * * *